United States Patent [19]
Salyer

[11] Patent Number: 5,788,912
[45] Date of Patent: Aug. 4, 1998

[54] METHOD FOR PRODUCING FLAME RETARDANT POROUS PRODUCTS AND PRODUCTS PRODUCED THEREBY

[75] Inventor: Ival O. Salyer, Dayton, Ohio

[73] Assignee: The University of Dayton, Dayton, Ohio

[21] Appl. No.: 837,371

[22] Filed: Apr. 17, 1997

[51] Int. Cl.$^6$ .................... C09K 21/00; C09D 9/16; B22N 9/00; C04B 16/08
[52] U.S. Cl. ............... 252/609; 428/921; 106/18.11; 106/18.21; 106/672; 106/677
[58] Field of Search .............. 252/609; 428/921; 106/18.11, 18.21, 672, 677

[56] References Cited

U.S. PATENT DOCUMENTS

| | | | |
|---|---|---|---|
| 3,677,808 | 7/1972 | Sheridan | 106/272 X |
| 4,098,748 | 7/1978 | Moore et al. | 523/200 |
| 4,259,401 | 3/1981 | Chahroudi et al. | 428/306 |
| 4,454,255 | 6/1984 | Ramlow et al. | 521/137 |
| 4,588,510 | 5/1986 | Salyer et al. | 252/5 |
| 4,612,255 | 9/1986 | Hein | 428/541 |
| 4,711,813 | 12/1987 | Salyer | 428/402 |
| 4,797,160 | 1/1989 | Salyer | 106/96 |
| 4,801,405 | 1/1989 | Yamada et al. | 252/609 |
| 4,820,810 | 4/1989 | Klein et al. | 536/4.1 |
| 4,851,291 | 7/1989 | Vigo et al. | 428/393 |
| 4,908,238 | 3/1990 | Vigo et al. | 427/389 |
| 5,028,286 | 7/1991 | Hsu | 156/62.4 |
| 5,089,559 | 2/1992 | Blount | 525/107 |
| 5,130,184 | 7/1992 | Ellis | 428/245 |
| 5,202,150 | 4/1993 | Benson et al. | 427/595 |
| 5,405,555 | 4/1995 | Riker | 252/607 |

Primary Examiner—C. H. Kelly
Attorney, Agent, or Firm—Killworth, Gottman, Hagan & Schaeff LLP

[57] ABSTRACT

A method for fire retarding porous products used for thermal energy storage and products produced thereby is provided. The method includes treating the surface of the phase change material-containing porous products with a urea fire-retarding agent. Upon exposure to a flame, the urea forms an adduct with the phase change material which will not sustain combustion (is self-extinguishing) in air. No halogens or metal oxides are contained in the fire retardant, so no potentially noxious halide smoke or fumes are emitted if the product is continuously exposed to a flame.

25 Claims, 1 Drawing Sheet

METHOD FOR PRODUCING FLAME RETARDANT POROUS PRODUCTS AND PRODUCTS PRODUCED THEREBY

GOVERNMENT RIGHTS

The Government has rights in this invention pursuant to Contract No. 19X-SC542C awarded by the Department of Energy.

BACKGROUND OF THE INVENTION

The present invention relates to a method of producing flame retardant porous products used for thermal energy storage and products produced thereby, and more particularly, to such a method which utilizes alkyl hydrocarbon phase change materials in building materials in combination with a urea fire retarding agent which forms an adduct with the phase change material upon exposure to a flame which will not sustain combustion.

Phase change materials are well known in the art and are widely used due to their inherent ability to store large amounts of heat and release it to the surrounding environment as temperatures drop below or exceed predetermined levels. Phase change materials are of particular interest for use in the architectural and building trades where climate control and energy consumption are principal considerations in building design and material selection. For example, by incorporating phase change materials into building materials such as concrete, cement, plaster, and other porous products, energy can be absorbed and released as needed to conserve heat or cool, thereby reducing energy costs and maintaining comfortable conditions.

Structural materials incorporating phase change materials are more desirable than those which store only sensible heat because they have a higher capacity to store energy and they absorb and release a large quantum of energy over a very narrow temperature range. A phase change material utilizes its latent heat of fusion as well as its sensible heat capacity for thermal storage. The latent heat of fusion is substantially greater than the sensible heat capacity of the material. That is, the amount of energy a material absorbs upon melting, or releases upon freezing, is much greater than the amount of energy it absorbs or releases upon increasing or decreasing in temperature 1° C. Thus, upon melting and freezing, per unit weight, a phase change material absorbs and releases substantially more energy than a sensible heat storage material which is heated or cooled through the same temperature range.

Phase change materials may be incorporated into building materials as an additive to the wet mix during the manufacturing process, or they may be imbibed into the finished products. However, where high concentrations of the phase change material are used (e.g., 30% composite weight), the resulting products have been found to be flammable, i.e., they have an undesirably high rate of flame spread.

A lower and more acceptable rate of flame spread can be obtained by reducing the concentration of the phase change material. For example, it has been found that a lower rate of flame spread is obtained in plasterboards when the concentration of the phase change material is maintained below about 15% composite weight in ½" and greater thickness plasterboards. However, this prevents the use of high concentrations of phase change material which are desirable to achieve the most effective energy conservation and peak load shifting.

As an alternative to reducing the concentration of the phase change materials, halogenated fire retardants such as chlorinated, brominated, or fluorinated hydrocarbons (typically used with a polyvalent metal oxide such as antimony oxide) may be used in combination with the phase change material to provide flame retardancy. Such fire retarding agents and methods for their incorporation in cementitious compositions are described in commonly assigned Reissue Pat. No. 34,880, issued Mar. 21, 1995 as a reissue of U.S. Pat. No. 4,797,160. The incorporation of such fire retarding agents has been successful in that the resulting products may contain higher percentages of phase change materials and yet be readily converted to self-extinguishing products. However, it has been found that if the fire retarded product containing the phase change material and halogenated fire retarding agent is continuously exposed to flame for an extended period of time, large quantities of white smoke, HCl, and trace amounts of $Cl_2$ are evolved. In a closed environment, these combustion by-products of such fire retarded products could pose a safety hazard.

Accordingly, there is still a need in the art for a method of producing flame-retarded products which contain an effective amount of a phase change material to provide adequate thermal energy storage, and which do not pose a potential safety hazard if continuously exposed to flame.

SUMMARY OF THE INVENTION

The present invention meets that need by providing a method of producing flame-retardant porous products containing phase change materials therein which may be used for thermal energy storage and by providing the products produced by that method. Such porous products may include building materials such as plasterboard, wallboard, concrete, ceiling tiles, insulation, foams, cotton batting, and the like. The products are treated with a urea fire retarding agent which is inexpensive, free of halogens or metal oxides, and which may be easily applied. The resulting treated products will not sustain combustion and do not produce any hazardous by-products upon exposure to a flame.

According to one aspect of the present invention, a method of producing a flame retardant porous product already containing a phase change material therein is provided. The method comprises the step of treating the porous product with a urea flame retarding agent which is free of halogens and metal oxides, where the phase change material and the flame retarding agent form an adduct upon exposure to a flame and will not sustain combustion.

Where the porous product comprises plasterboard, the product preferably contains the phase change material in an amount of at least 15% composite weight. Other porous products preferably contain from about 1.5 grams to 3 grams of phase change material per square inch of product in order to provide the proper thermal energy storage. The phase change material is preferably selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons.

In one embodiment of the invention, the flame retarding agent comprises liquid urea. In another embodiment of the invention, the flame retarding agent is in the form of a solution comprising urea, water and a surfactant.

The porous product is preferably surface treated with the urea flame retarding agent from about 15 seconds up to about 10 minutes. The flame retarding agent may be applied to the product by spraying the agent onto the product or alternatively, by dipping the product in the flame retarding agent.

In an alternative embodiment of the invention, a method of producing a flame retardant porous product is provided comprising the steps of incorporating a phase change material into the porous product and then treating the porous product containing the phase change material with a urea fire retardant which is free of halogens and metal oxides. The phase change material is preferably selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons.

In a preferred embodiment of the invention, the phase change material is incorporated into the porous product by dipping the product into a liquid bath of the phase change material for a period of about 1 to 10 minutes.

In an alternative embodiment in which the porous product is formed from a cementitious composition, the phase change material is preferably added to a wet mix of the cementitious composition which is then allowed to harden and form the porous product. Such cementitious products may include cement, plaster, or concrete.

After the porous product has been incorporated with the phase change material, the product is then surface treated with the urea flame retarding agent from about 15 seconds up to 10 minutes. The flame retarding agent comprises liquid urea, or alternatively, a solution of urea, water, and a surfactant. The flame retarding agent may be sprayed onto the product or the product may be dipped in the flame retarding agent.

The resulting treated products may be used for thermal energy storage applications, and if exposed to a flame, will not sustain combustion and will not produce any hazardous by-products.

Thus, it is a feature of the invention to provide a method for producing fire-retardant porous products containing phase change materials therein and to provide products produced by that method. This, and other features and advantages of the present invention will become apparent from the following detailed description and the appended claims.

DETAILED DESCRIPTION OF THE PREFERRED EMBODIMENT

Figure 1:
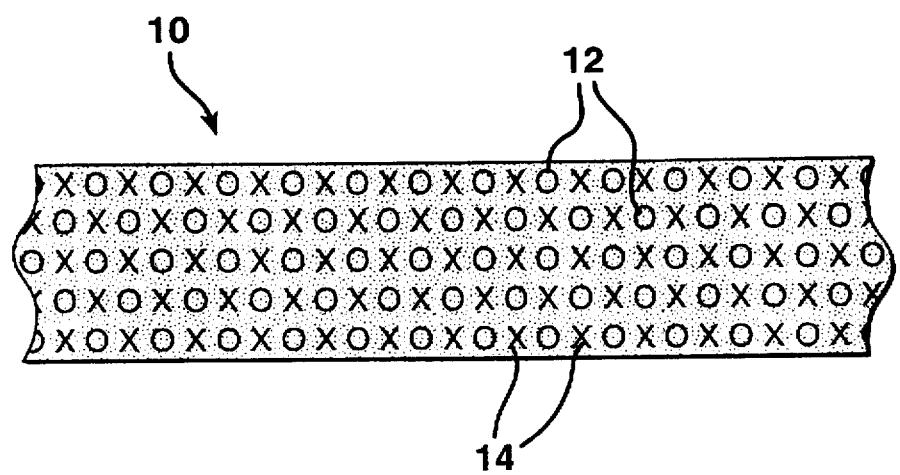
FIG. 1 is a cross-sectional view of a section of wallboard which has been incorporated with a phase change material and surface treated with a flame-retarding agent in accordance with the present invention.

The present invention provides several advantages over previous fire retarding methods in that the products are treated with a urea fire retarding agent which is free of halogens or metal oxides, so that no potentially noxious halide smoke or fumes are emitted if the product is continuously exposed to a flame source. In addition, the urea fire retarding agent is low cost and easy to apply.

The method of the present invention is preferably used to fire retard the surface of porous products containing phase change materials and especially products such as plasterboard containing 15% and higher composite weight phase change materials. Preferably, the porous products contain or are imbibed with phase change materials (PCMs) comprised of linear crystalline alkyl hydrocarbons. Such phase change materials are preferred for use in the present invention because they melt and freeze near the desired thermal transfer temperature range of about 25° C., have high thermal energy storage capacity (e.g., 45 cal/g), are non-toxic, stable to thermocycling, are low in cost, and readily available. Other preferred phase change materials include crystalline fatty acids, crystalline fatty acid esters, crystalline primary alcohols, crystalline 1-olefins, crystalline alicyclic hydrocarbons, and crystalline aromatic hydrocarbons.

A number of commercially available waxes made up primarily of linear crystalline alkyl hydrocarbons are useful as phase change materials in the present invention including Witco K-18 and Witco LLN, products of Witco Corp., New York, N.Y. These waxes have a heat of fusion greater than 30 cal/g and are relatively inexpensive. The phase change material should be selected so as to have a melting temperature in the desired range for the intended application. For example, for heating and cooling in buildings, a paraffin of about C-18 chain length that melts and freezes near room temperature (about 25° C.) is preferable.

Another suitable phase change material is octadecane A-18, available from Humphrey Chemical Company, which has a thermal energy storage capacity of about 50–55 cal/g.

While these are the preferred phase change materials for building applications, it should be appreciated that the present invention may be applicable to products used for other applications, such as shipping containers for use in shipping medications, food, etc. at controlled temperatures. For such applications, other phase change materials may be used which melt and freeze within a thermal transfer temperature range of about 0° C. to 80° C.

In embodiments where the porous products are formed from cementitious compositions, the phase change material may be incorporated into cementitious compositions at the wet mix stage during manufacturing by blending the phase change material in the form of pellets or granules with other components of the cement or concrete prior to shaping the compositions and allowing them to harden. Such a method is described in Reissue Pat. No. 34,880, the disclosure of which is hereby incorporated by reference.

A more preferred method of incorporating the phase change material into the porous products is an imbibing process in which the finished product is dipped into a liquid bath of the phase change material. The phase change material is preferably heated to a temperature of about 75° C. to allow easier penetration into the surface of the product as well as to allow quick drying. The imbibing process may take from about 1 to 10 minutes, depending on the thickness of the product as well its porosity. For example, a wallboard of about ½ inch thickness may only need to be treated for 1 to 2 minutes, while a wallboard of about ¾ to ⅝ inches should be treated for about 5 to 10 minutes. Products such as open-cell foams or ceiling tiles need only be treated for about 15 seconds to 2 minutes.

This imbibing process results in a more uniform distribution of the phase change material as well as a higher concentration of the phase change material at the surface of the product. This method is also significantly lower in cost than adding the phase change material to the wet mix stage during manufacturing, and has the further advantage that the wet strength properties of the resulting products are improved.

After incorporation of the phase change material, the product is then treated with the urea flame-retarding agent. In embodiments where liquid urea is used for treatment, the urea is preferably heated to a temperature of above 132° C. to allow it to wet the surface of the product quickly and dry quickly once applied.

A more preferred form of the fire retarding agent is a solution comprising from about 5 to 30% by weight concentrated urea, about 1% of a surfactant, and the balance water. Anionic, cationic, or nonionic surfactants may be used in the solution, although nonionic surfactants are preferred for use. This solution may be applied to the PCM-imbibed product at room temperature.

The PCM-imbibed product may then be dipped in or sprayed with the liquid urea or urea solution. To ensure adequate surface penetration, the product may be treated for a period of from about 15 seconds up to 10 minutes, again depending on the thickness and/or porosity of the product.

It should be appreciated that the achievement of both adequate thermal energy storage (at least 30 cal/gm) and adequate fire retardance (self-extinguishing) is dependent upon the concentration of the phase change material and fire retardant per unit of area and per unit of volume of the porous product.

FIG. 1 illustrates a section of a cementitious wallboard 10 including a phase change material 12 therein and which has been treated with a urea flame-retarding agent 14 in accordance with the process of the present invention. As can be seen, the wallboard has been treated such that the flame-retarding agent is primarily on the surface of the wallboard. If the treated product is exposed to a flame, the urea forms an adduct, or inclusion complex with the phase change material at the surface of the treated product to provide a self extinguishing feature. The adduct which is formed contains a high percentage (about 70% to 80% by weight) of the urea fire retardant, and about 20% to 30% by weight of the phase change material. The only components evolved upon exposure to a flame are nitrogen and water, which are environmentally safe.

In order that the invention may be more readily understood, reference is made to the following example, which is intended to be illustrative of the invention, but is not intended to be limit limiting in scope.

EXAMPLE 1

Small samples of ½" thick plasterboard were imbibed with WITCO K-18 PCM to the level of 15 and 30% composite weight. Samples of the PCM imbibed plasterboard were then imbibed with liquid urea at a temperature just above the 132° C. melting point of urea for a period of 1, 2 and 5 minutes. The weight gain (uptake of urea) was determined in each case as shown below in Table I.

TABLE I

| Sample No. | Composite Weight % PCM | Urea Treatment Time (min.) | Original Weight (g) | Final Weight (g) | Weight Gain (g) |
|---|---|---|---|---|---|
| 1 | 30 | 5 | 31.12 | 35.01 | 3.89 |
| 2 | 30 | 5 | 30.79 | 35.67 | 4.88 |
| 3 | 30 | 2 | 30.98 | 33.66 | 2.68 |
| 4 | 30 | 2 | 30.92 | 33.52 | 2.60 |
| 5 | 30 | 1 | 32.87 | 36.27 | 3.40 |
| 6 | 30 | 1 | 31.45 | 33.70 | 2.25 |
| 7 | 15 | 1 | 25.66 | 30.01 | 4.35 |
| 8 | 15 | 1 | 25.48 | 29.86 | 4.38 |
| 9 | 15 | 2 | 26.14 | 32.10 | 5.96 |
| 10 | 15 | 2 | 25.74 | 31.80 | 6.06 |
| 11 | 15 | 5 | 23.95 | 36.24 | 12.29 |
| 12 | 15 | 5 | 24.42 | 37.62 | 13.20 |

The resulting samples were then tested along with control samples, for ignitability, time to extinguish, and observed for flame travel and smoke. As can be seen from the results in Table II, samples 5 and 6, which were imbibed for only 1 minute with urea, were easily ignitable, while the samples imbibed with urea for 2 or 5 minutes were not ignitable. It is noted that non-ignitable compositions were obtained even with 30% composite weight PCM after imbibing for 2 minutes in liquid urea.

TABLE 2

FIRE RETARDANCE TESTS OF PCM IMBIBED AND UREA TREATED PLASTERBOARD

| Sample No. | Time to Ignite (sec.) | Time to Extinguish (sec.) | Flame Traveled | Smoke |
|---|---|---|---|---|
| Control 1 (30% PCM composite wt.) | 4 | >30 | Yes | white |
| Control 2 (30% PCM composite wt.) | 5 | >30 | Yes | white |
| 1 | No | No | No | white |
| 2 | No | No | No | white |
| 3 | No | No | No | white |
| 4 | No | No | No | white |
| 5 | 15 | >30 | Yes | 1" flame |
| 6 | 18 | >5 min. | Yes | 1" flame |
| 7 | No | No | No | white |
| 8 | No | No | No | white |
| 9 | No | No | No | white |
| 10 | No | No | No | white |
| 11 | No | No | No | white |
| 12 | No | No | No | white |
| Control 3 (15% PCM composite wt.) | 16 | 40 | Yes | white |
| Control 4 (15% PCM composite wt.) | 22 | 45 | Yes | white |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of producing a flame retardant porous product containing a phase change material therein comprising the step of treating said porous product with a urea flame retarding agent which is free of halogens and metal oxides, wherein said phase change material and said flame retarding agent form an adduct upon exposure to a flame and will not sustain combustion.

2. The method of claim 1 in which said porous product comprises plasterboard and said phase change material is contained in said porous product in a amount of at least 15% composite weight.

3. The method of claim 1 in which said phase change material is contained in said porous product in an amount of from about 1.5 grams to 3 grams per square inch of said product.

4. The method of claim 1 in which said phase change material is selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons and crystalline aromatic hydrocarbons.

5. The method of claim 1 in which said porous product is treated with said urea flame retarding agent from about 15 seconds up to about 10 minutes.

6. The method of claim 1 in which said porous product is dipped in said urea flame retarding agent.

7. The method of claim 1 in which said urea flame retarding agent is sprayed onto said porous product.

8. A method of producing a flame retardant porous product comprising the steps of:
   a) incorporating a phase change material into said porous product; and
   b) treating said porous product containing said phase change material with a urea fire retardant which is free of halogens and antimony oxides; wherein said phase change material and said fire retardant form an adduct upon exposure to a flame and will not sustain combustion.

9. The method of claim 8 in which said phase change material is selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons and crystalline aromatic hydrocarbons.

10. The method of claim 8 in which said phase change material is incorporated into said porous product by dipping said product into a liquid bath of said phase change material for a period of from about 1 to 10 minutes.

11. The method of claim 8 wherein said porous product is formed from a cementitious composition, and wherein said phase change material is added to a wet mix of said cementitious composition which then hardens to form said porous product.

12. The method of claim 8 in which said porous product comprises plasterboard and said phase change material is incorporated into said porous product in an amount of at least 15% composite weight.

13. The method of claim 8 in which said phase change material is contained in said porous product in an amount of about 1.5 grams to 3 grams per square inch of said product.

14. The method of claim 8 in which said porous product is treated with said urea flame retarding agent from about 15 seconds up to about 10 minutes.

15. The method of claim 8 in which said porous product is dipped in said urea flame retarding agent.

16. The method of claim 8 in which said porous product is sprayed with said urea flame retarding agent.

17. A flame retardant porous product containing a phase change material therein and including a urea flame retarding agent on its surface, said urea flame retarding agent being free of halogens and metal oxides, wherein said phase change material and said urea flame retarding agent form an adduct upon exposure to a flame and will not sustain combustion.

18. The flame retardant porous product of claim 17 in which said porous product comprises plasterboard and said phase change material is contained in said porous product in an amount of at least 15% composite weight.

19. The flame retardant porous product of claim 17 in which said phase change material is contained in said porous product in an amount of from about 1.5 grams to 3 grams per square inch of said product.

20. The flame retardant porous product of claim 17 in which said phase change material is selected from the group consisting of linear crystalline alkyl hydrocarbons, crystalline fatty acids, crystalline fatty acid esters, crystalline 1-olefins, crystalline 1-halides, crystalline primary alcohols, crystalline alicyclic hydrocarbons and crystalline aromatic hydrocarbons.

21. The flame retardant porous product of claim 17 in which said porous product is selected from the group consisting of plasterboard, wallboard, concrete, ceiling tiles, insulation, foams, and cotton batting.

22. A method of producing a flame retardant porous product containing a phase change material therein comprising the step of treating said porous product with a liquid urea flame retarding agent which is free of halogens and metal oxides, wherein said phase change material and said flame retarding agent form an adduct upon exposure to a flame and will not sustain combustion.

23. A method of producing a flame retardant porous product containing a phase change material therein comprising the step of treating said porous product with a urea flame retarding agent which is free of halogens and metal oxides, wherein said urea flame retarding agent is in the form of a solution comprising urea, water and a surfactant, and wherein said phase change material and said flame retarding agent form an adduct upon exposure to a flame and will not sustain combustion.

24. A method of producing a flame retardant porous product comprising the steps of:
   a) incorporating a phase change material into said porous product; and
   b) treating said porous product containing said phase change material with a liquid urea fire retardant which is free of halogens and antimony oxides; wherein said phase change material and said fire retardant form an adduct upon exposure to a flame and will not sustain combustion.

25. A method of producing a flame retardant porous product comprising the steps of:
   a) incorporating a phase change material into said porous product; and
   b) treating said porous product containing said phase change material with a urea fire retardant which is free of halogens and antimony oxides; wherein said urea fire retardant is in the form of a solution comprising urea, water and a surfactant; and wherein said phase change material and said fire retardant form an adduct upon exposure to a flame and will not sustain combustion.

* * * * *